Jan. 22, 1924.
W. S. LA LONDE
1,481,471
ELECTRIC SIGNAL TROUBLE INDICATOR FOR AUTOMOBILES
Filed March 9, 1921 5 Sheets-Sheet 1
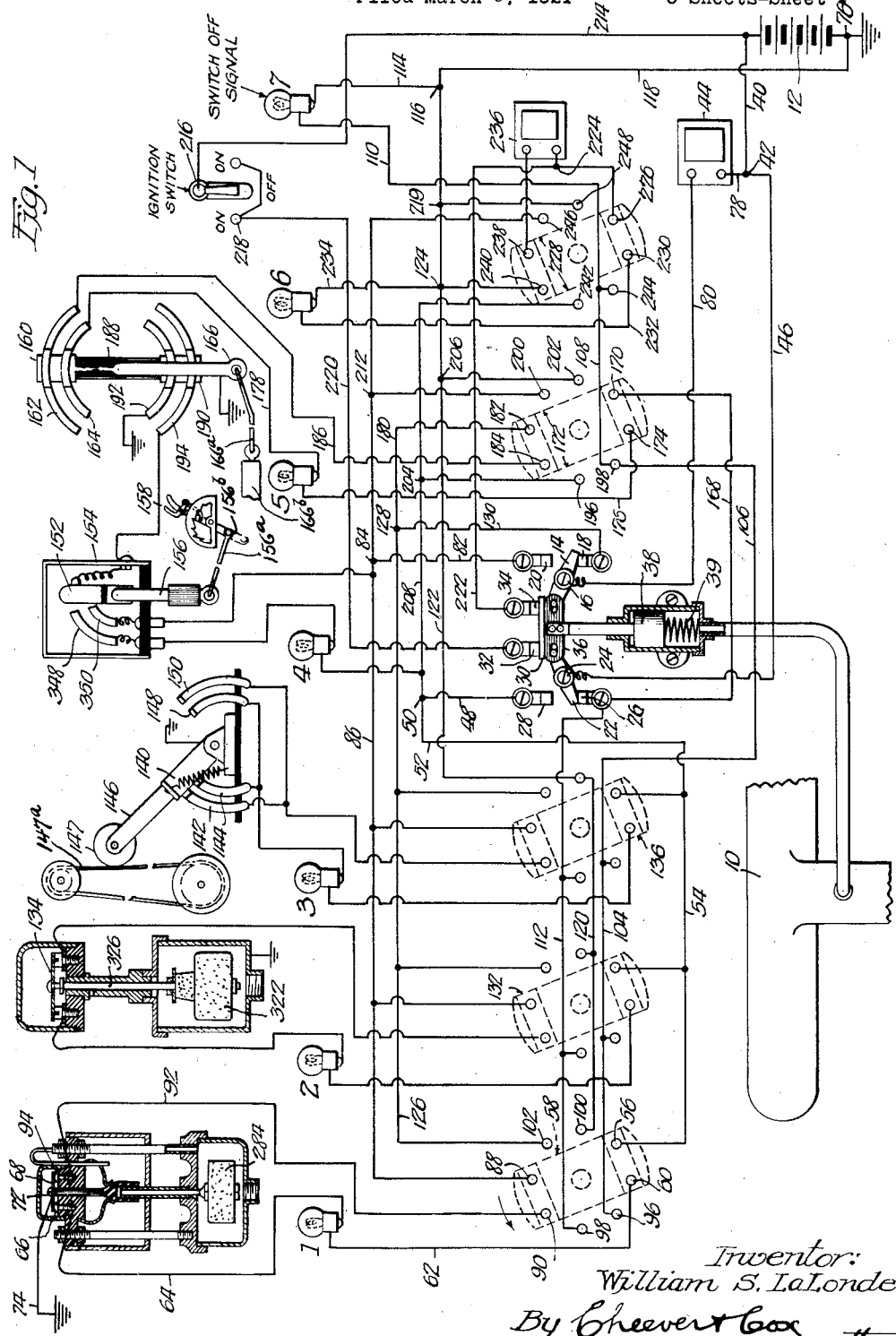
Inventor:
William S. LaLonde
By Cheever + Cox
attys.

Jan. 22, 1924.
W. S. LA LONDE
1,481,471
ELECTRIC SIGNAL TROUBLE INDICATOR FOR AUTOMOBILES
Filed March 9, 1921     5 Sheets-Sheet 2
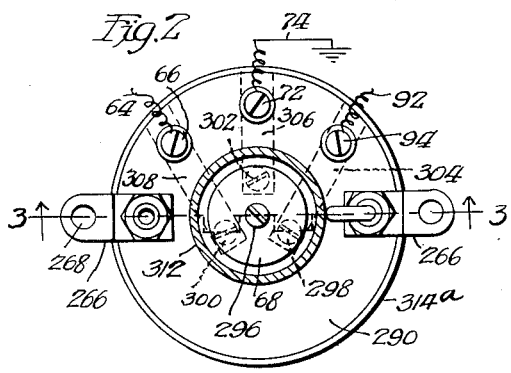
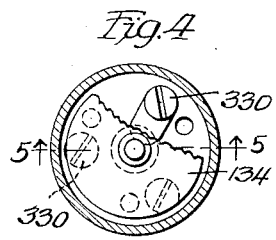
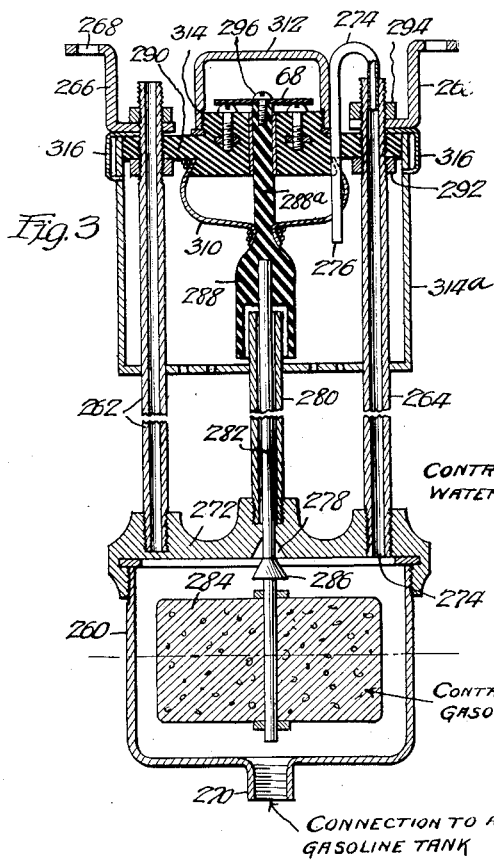
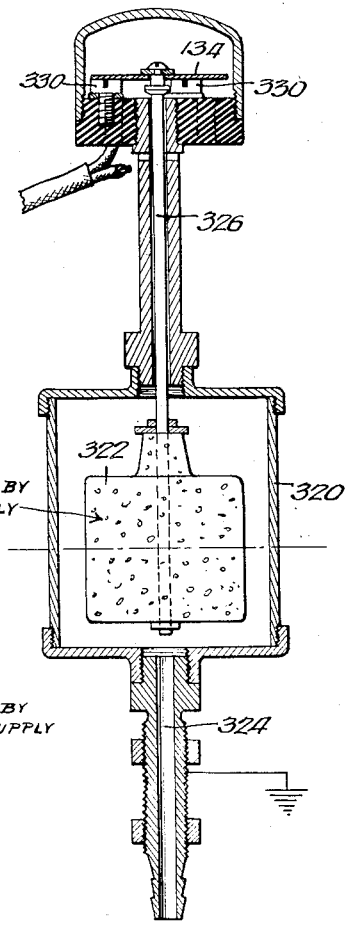
Inventor
William S. La Londe,
By Cheever & Cox
Attys.

Jan. 22, 1924. 1,481,471
W. S. LA LONDE
ELECTRIC SIGNAL TROUBLE INDICATOR FOR AUTOMOBILES
Filed March 9, 1921 5 Sheets-Sheet 3
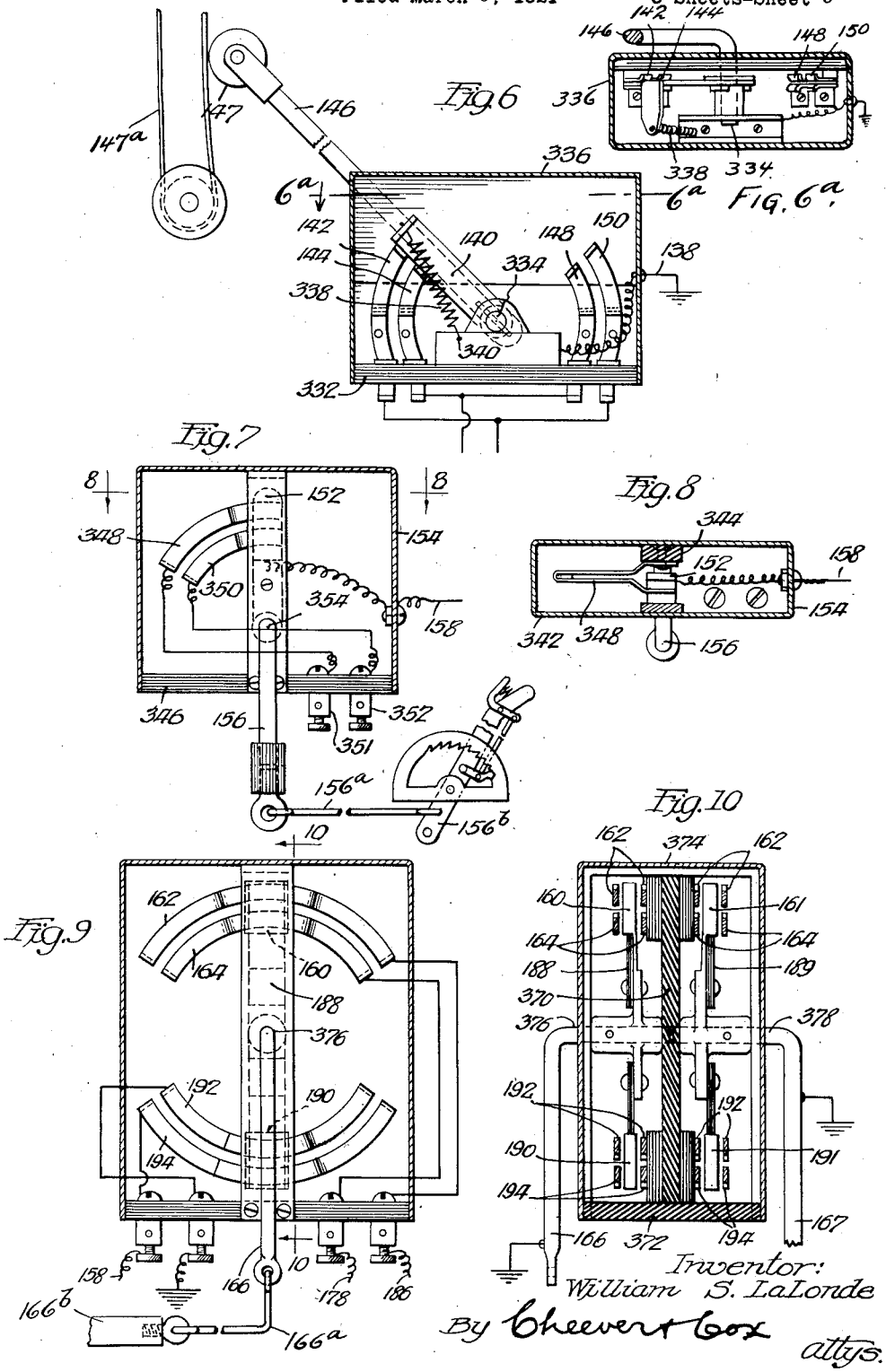

Jan. 22, 1924. 1,481,471
W. S. LA LONDE
ELECTRIC SIGNAL TROUBLE INDICATOR FOR AUTOMOBILES
Filed March 9, 1921  5 Sheets-Sheet 4

Inventor:
William S. La Londe
By Cheever Cox
Attys

Jan. 22, 1924.

W. S. LA LONDE 1,481,471

ELECTRIC SIGNAL TROUBLE INDICATOR FOR AUTOMOBILES

Filed March 9, 1921  5 Sheets-Sheet 5

Inventor:
William S. La Londe
By Cheever & Cox
Attys

Patented Jan. 22, 1924.

1,481,471

UNITED STATES PATENT OFFICE.

WILLIAM S. LA LONDE, OF EVANSTON, ILLINOIS.

ELECTRIC-SIGNAL TROUBLE INDICATOR FOR AUTOMOBILES.

Application filed March 9, 1921. Serial No. 450,853.

*To all whom it may concern:*

Be it known that I, WILLIAM S. LA LONDE, a citizen of the United States, residing at Evanston, in the county of Cook and State of Illinois, have invented a certain new and useful Improvement in Electric-Signal Trouble Indicators for Automobiles, of which the following is a specification.

This invention is an electric signal trouble indicator for automobiles, motor boats and the like, wherever internal combustion engines are used, and its object is to equip such mechanism with audible indicators such as buzzers and with a plurality of visible indicators such as electric light warning signals, normally inoperative, in which a buzzer and one of the lights will be thrown in operation whenever trouble occurs or is about to occur at any one of a plurality of points connected to or in the running of the machine, as for instance, when the gasoline or other liquid fuel is getting low, when the water in the radiator is getting low, when the fan belt is too loose or broken or otherwise not operating properly, when the hand brake is set when the car is running, and when the gears are left in mesh, and when the ignition switch is left on and the engine stopped. The invention is not limited to a specific number, more or less, of parts of the machine to which signal or telltale circuits are connected.

The invention consists in providing at a convenient place in view and hearing of the operator of an automobile or the like, a plurality of signals observable by him, each one controlled by some device connected thereto where trouble is apt to occur and to so connect said signals to the battery thereof in combination with the engine intake manifold, that those which are of importance in the actual running of the machine may be operated during the running of the engine whenever trouble occurs at the parts to which specific signals are attached, and that those which are to tell of conditions when the machine is at rest, will be operated when the engine stops, and that none of the signals will remain in operation with consequent waste of electric energy under reversed conditions or after the signaled requirements have been properly adjusted by the operator.

The invention further consists in means for temporarily cutting out a running signal and in so doing setting a reminder signal to the operator, automatically operatable when the engine stops.

The invention further consists in a novel switch operating mechanism controlled by the gasoline in the gasoline tank when gasoline or other liquid fuel in the gasoline tank is exhausted beyond a certain point.

The invention further consists in a switch operated by the water in the radiator of the engine when the water therein gets low.

The invention further consists in a novel mechanism connected to the fan belt of an automobile engine operated when the fan belt gets too loose or breaks to throw a switch to indicate the condition of the fan belt in the general system of the main invention.

The invention further consists in a novel switch operating mechanism for use in the general system described operated by the hand brake of the automobile.

The invention further consists in a novel transmission gear shift mechanism for use in the general system described, operated in connection with rods attached to the ends of the transmission gear shafts of the automobile.

The invention further consists in many other features and details of construction which will be hereafter more fully set forth in the specification and claims.

Referring to the drawings in which like numerals represent the same parts thruout the several views:

Figure 1 is a wiring diagram of mechanism embodying this invention in its preferred form designed for application to four parts on a car where trouble may occur during its running and to two parts, as for instance the gear shift, and ignition switch, where trouble may occur when engine stops.

Figure 2 is a plan view. Figure 3 is a side view largely in section taken on the line 3—3 of Figure 2 of the switch mechanism attached to the gasoline tank and operated by the gasoline therein.

Figure 4 is a plan and Figure 5 an elevation view, largely in section taken on the line 5—5 of Figure 4 of an improved switch mechanism attached to the radiator and operated by the water therein to show the condition of the water.

Figure 6 is a side elevation and Figure 6ª is a sectional view taken on the line 6ª—6ª of Figure 6 of the improved switch mechanism of this invention operated by the fan belt of the automobile to which the mechanism is applied.

Figure 7 is a side view and Figure 8 a plan view of the switch mechanism of this invention operated by the hand brake of the automobile, the latter figure being taken on the line 8—8 of Figure 7.

Figure 9 is a side view and Figure 10 is a sectional detail view on the line 10—10 of Figure 9, showing the improved switch mechanism of this invention operated in connection with rods attached to the ends of the transmission gear shafts by the gear shift of the automobile to perform the functions hereinafter described.

Figure 11:
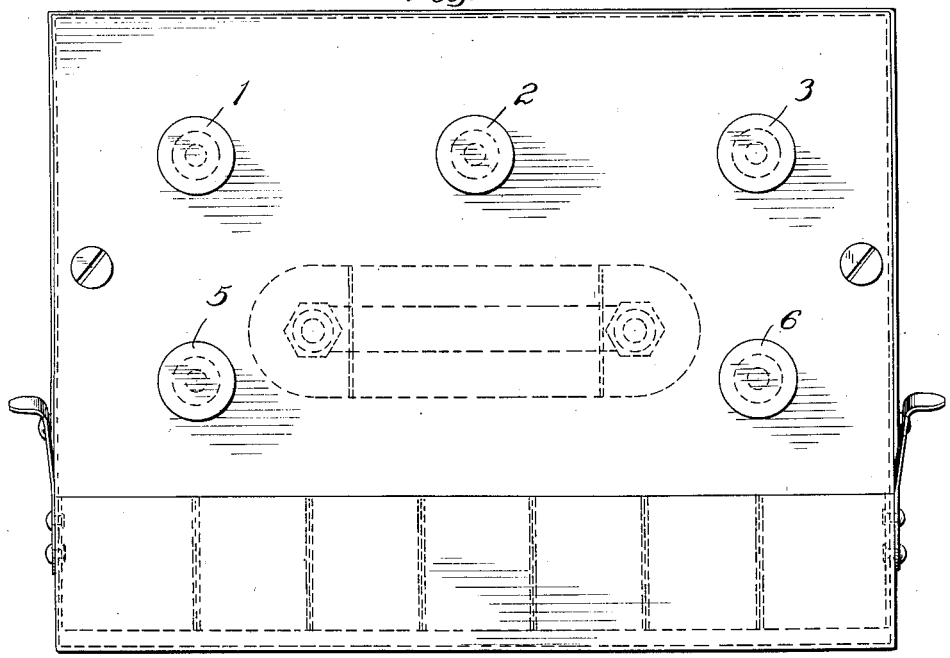

Figure 11 is a face view of the signal box facing the operator of the automobile, containing the mechanism accessible to him for use in operation by him of the system hereafter described.

Figure 12:
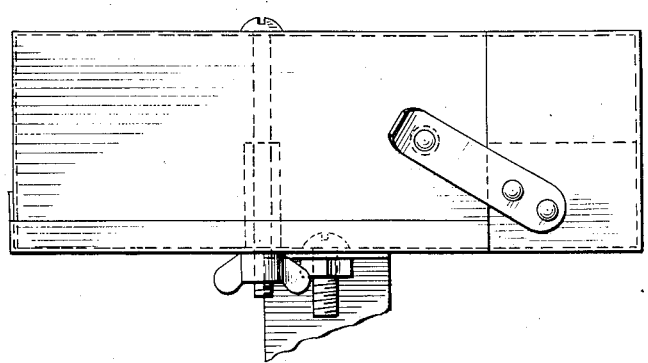
Figure 13:
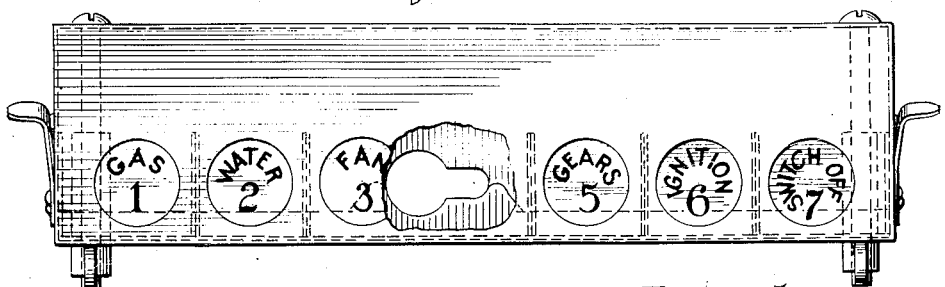

Figure 12 is an end and Figure 13 a side view of the box of Figure 11.

Figure 14:
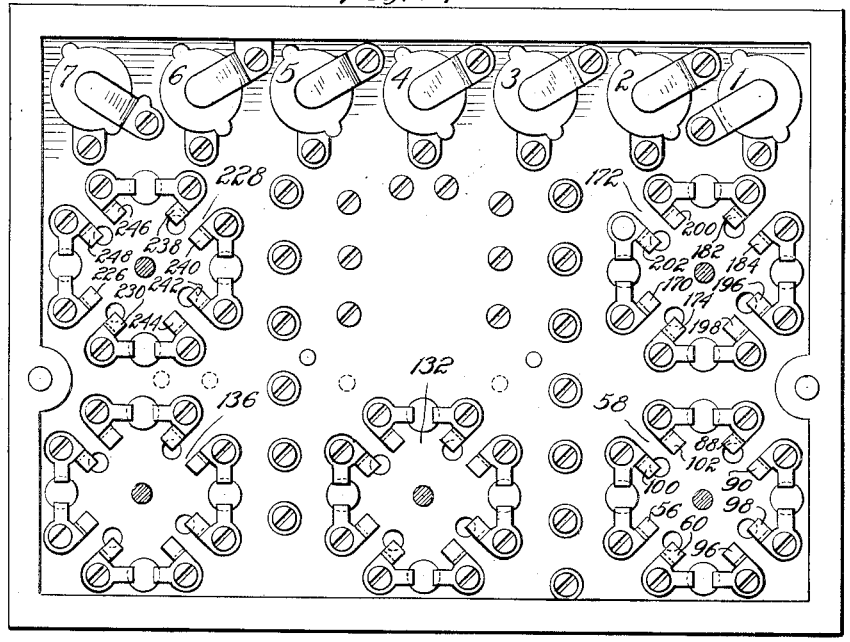

Figure 14 is a face view of the electrical switch board device contained in the cabinet of Figure 11 as it appears when the cover is removed.

Figure 15:
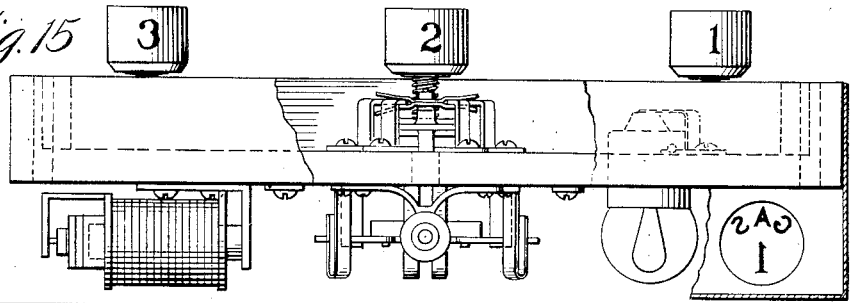
Figure 16:
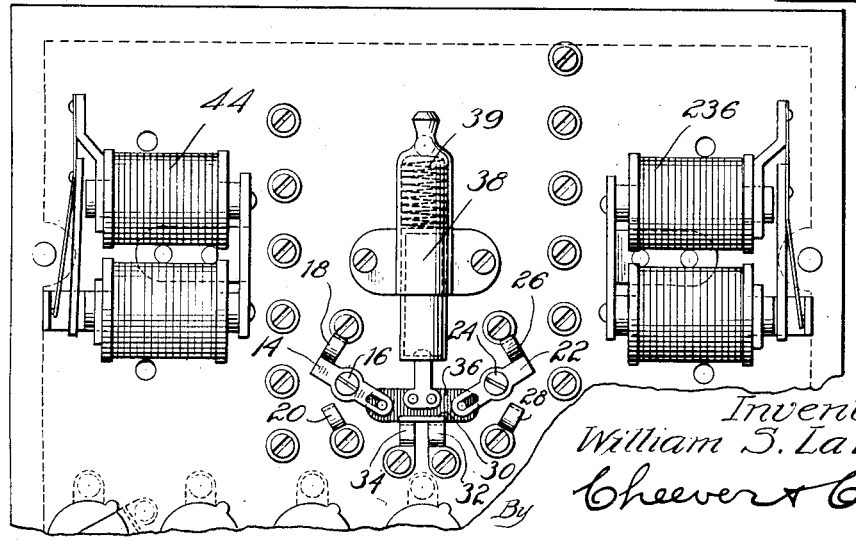

Figure 15 is a partial side view of the mechanism of Figures 14 and 16.

Figure 16 is a partial bottom view of the mechanism of Figures 14 and 15.

Figure 1 shows in reduced picture form the five special switch mechanisms shown in detail in the various figures heretofore referred to applied respectively to gasoline tank, to radiator to fan belt, to brake lever, to transmission gear and in addition thereto shows conventionally the ignition switch and a switch off signal lamp 7, all connected into an electric circuit or series of electric circuits controlled by manifold 10 of the engine so that trouble is automatically shown to the operator when it occurs at the gasoline tank, radiator, the fan belt, and the brake lever while the engine is running and that an improper condition is indicated to the operator when with the engine stopped there is an improper condition existing in position of the transmission gear and the ignition switch. The electric circuits for producing these results and the method of manipulating the apparatus therefor will be hereafter described.

The particular mechanism illustrating this invention shown in the drawings is equipped with two buzzers, and seven electric lamps numbered 1 to 7 inclusive. All these lamps are in electric circuits which under proper switch conditions established by the engine, in the particular case here illustrated thru the vacuum in the manifold 10, supply them with current from the lighting and starting battery 12 carried by the car. The circuits from this battery to these buzzers and lamps are controlled by switch 14 pivoted at 16 moving between contact points 18 and 20; switch 22 pivoted at 24 moving between contact points 26 and 28; and circuit closing bar 30 movable into and out of contact with points 32 and 34, all moved by cross arm 36 operated by the action of plunger 38 and spring 39 in communication with manifold 10 in such a manner as will fully appear hereafter that current from battery 12 only passes to lamps 1 to 4 when the manifold 10 is in operation.

The detailed circuit by which current passes from battery 12 to one lamp, as for instance 1, is as follows:—

Current leaving the battery 12 travels along wire 40 to junction 42 where it divides in parallel, one part going to light the signal lamps, the other part going to operate buzzer 44. The part for lamp 1 passes along wire 46 to pivot post 24 of switch 22, operated as heretofore referred to. When cross arm 36 moves switch 22 into engagement with contact point 28, the current travels along wire 48 to junction 50 thence along wire 52 and wire 54 to switch terminal 56 thence across the switch member 58 to be hereafter described, to switch terminal 60, thence along wire 62 to lamp 1. Returning from the lamp, the current passes along wire 64 to terminal 66 of switch 68 across switch 68 to ground terminal 72 thence along wire 74 to ground; viz, to the metal frame or engine of the automobile or other grounded parts, and when the switch 68 is closed the current delivered from the lamp travels thru switch 68 as described and returns by ground to terminal 76 of the battery.

Battery current for the buzzer 44 leaves junction 42 and passes along wire 78 thru buzzer 44 along wire 80 to pivot post 16 of switch 14, operated as heretofore referred to. When cross arm 36 moves switch 14 in engagement with contact point 20, the current travels along wire 82 to junction 84 thence along wire 86 to switch terminal 88 of switch member 58, heretofore referred to, thence across the switch 58 to terminal 90, thence along wire 92 to terminal 94 of switch 68, across switch 68 to ground terminal 72 thence along ground wire 74 to ground as heretofore described. Detail of switch 68 operated by the gasoline in the gasoline tank and connections are shown in Figures 2 and 3 of the drawings.

In other words, the current flowing on closing switch 68 is made up of two parts in parallel, one of which energizes lamp 1 which is individual to the special mechanism, such as the gasoline tank, which switch 68 controls and it also energizes audible buzzer 44 which is common to certain circuits of the device and when sounded merely calls the operator's attention to the fact that there is trouble somewhere in the system, the light indicating the specific part. Switch 68 is only closed by the mechanism shown, hereafter more fully appearing, when there is a shortage of gasoline in the main tank. Therefore the lamp and buzzer are both inoperative and therefore not wasting battery current so long as the mechanism controlling switch 68 is properly functioning.

When switch 58 is in position to cause the operation just described, it connects two opposite pairs of contacts 56 and 60, and 88 and 90. The same switch is adapted to be swung thru 90 degrees to connect two other pairs of contacts 96 and 98, and 100 and 102 respectively. Contact 96, just referred to, is connected by wire 104—106—108—110 to one terminal of lamp 7. Contact 98 is connected by wire 112 to contact 26. When contact 26 is in engagement with switch 22 there is a continuous circuit from wire 112 thru switch 22 and contact 26 thereof, wire 46, junction 42 and wire 40 to the battery 12. The opposite terminal of lamp 7 is connected thru wire 114, junction 116, wire 118, to ground 76. The result is that when switch 58 is thrown so that it closes the circuit across contacts 96 and 98 current tends to flow from the battery 12 thru lamp 7, but it is to be noted that current flow only takes place when the switch 22 is in the position shown, which is when the engine is at rest. When however switch 22 is thrown up from the position shown in the drawing, until it engages contact 28 and by the same movement switch 14 engages contact 20, the contact engagements 22—26 and 14—18 are broken and consequently lamp 7 does not light while the engine is running. In the operation of this feature of the device, assume that the predetermined minimum quantity of gasoline is reached in the tank to which switch 68 is attached and it thereby moves switch 68 into engagement with contact terminals 66—72—94, thus sounding the buzzer 44 and lighting lamp 1. If now the operator does not wish to stop to replenish the supply of gasoline, he throws switch 59 from the position shown in the drawing to the position in which he closes contacts 96—98, thus breaking the circuit to lamp 1, but in so doing he puts lamp 7 in circuit as to everything except the closing of switch 22 with contact 26 and switch 14 with contact 18 which takes place when the engine stops, and the vacuum created in manifold 10 ceases to draw plunger 38 down as shown against the action of spring 39. This lights lamp 7 which reminds him when the engine stops that a switch has been turned off. Upon examination he finds that it is switch 68 controlling lamp 1 and he is thereupon reminded to add to his supply of gasoline as indicated by switch 68. This system of operation also applies to other switches hereinafter described.

Similarly the throwing of switch 58 about 90 degrees into engagement with contacts 96—98 disconnects contacts 88—90 and thus throws off buzzer 44 but in so doing connects contacts 100—102 thus again causing buzzer 44 to be thrown into circuit whenever the engine stops and lamp 7 is energized. This is accomplished by connecting terminal 100 thru wire 120—122, junctions 206, 124, 219 and 116, wire 118 to ground 76. Terminal 102 is connected by wire 126, junction 128, wire 130, to contact 18, and thence thru switch 14 pivot post 16, wire 80, to buzzer 44, thru it to wire 78, junction 42, wire 40, to battery 12.

The contact ends of switch 58 and other corresponding switches are well insulated one from the other.

The circuits controlling lamp 2 are parallels of the circuits of lamp 1; switch 132 corresponding to switch 58, switch 134 for lamp 2 is operated by the water in the radiator of the engine and is similar in operation to switch 68, heretofore described. Details of switch 134 and connections are shown in Figures 4 and 5 of drawings.

The circuits controlling lamp 3 are parallels of the circuits of lamp 1; switch 136 corresponding to switch 58. Switch 140 is controlled by the fan belt 147$^a$ of the fan attached to the engine, said belt, in the case here illustrated, normally sustaining roller 147. The particular switch mechanism shown is constructed in such a manner that when the belt is too loose or breaks switch arm 140 drops, thereby grounding contacts 142 and 144. When repair is to be made the engine is stopped and arm 146 is manually thrown back out of the way and in so doing arm 140 connects contacts 148 and 150 to ground so that after repair has been made if the operator neglects to bring arm 146 back in proper position the buzzer will sound and the lamp will light when the engine is started, indicating that further attention is required at that part. Switch 140 is shown in more detail in Figure 6 of the drawings.

The function of lamp 4 is similar to that of lamps 2 and 3, in parallel circuit with lamp 1 and is controlled by switch 152 operated in connection with the hand brake of an automobile. This switch is constructed so that switch housing 154, upper part of switch arm 156 and all other parts are insulated from ground except as to ground wire 158 which remains open as long as the transmission gear shafts are not moved to engage the gears, and therefore that the brake may be applied without necessarily giving a signal while the engine is at rest or running. When, however, the engine is running and the brake is on or set, and the gear shafts, such as 166ᵇ, connectable by rods, such as 166ᵃ, to the switch arms 166 and 167, are moved to engage or are about to engage the gears the closing of the ground circuit wire 158 by the switch mechanism connected to the gear shafts, hereinafter to be described, will place in operation the buzzer 44 and lamp 4 calling attention to the position of the brake.

As the operator will never, in practice, need to switch this lamp and buzzer signal off, having the control of the brake at hand, the circuit of lamp 4 is not provided with a switch mechanism like 58 or 132 or 136 designed to operate lamp 7 and the buzzer 44 on the stopping of the engine.

Switch mechanism 152 is shown in detail in Figures 7 and 8 of the drawings.

Lamp 5 is in a circuit controlled by a double switch, one of which is put in operation every time the transmission gear shafts of the car are moved to engage the gears. Switch 160 and its related members as diagrammatically shown in Figure 1 is one part of the device operated, say, by the shaft controlling the high and second gears; another switch 161 shown in Figure 10 is operated by, say, the shaft controlling the low and reverse gears. Switch members 162 and 164 are insulated one from the other, but are each of them in circuit with their companion parts. Switch 160 and 161 are grounded in connection with the switch arms 166 and 167 respectively. Both switches 160 and 161 and their connecting arms are made to rotate back and forth independently of each other, corresponding to the shifting of the transmission gear shafts to four different positions. When the transmission gear shafts disengage the gears, the switches remain vertically as shown and are out of engagement with contact arms. As it is necessary to have these gears in mesh when the car is running, there is no occasion for any signal under this condition. The device is therefore so constructed that lamp 5 is only lighted when the gears are in mesh and the engine is stopped. This is accomplished by taking some of the current at switch 22 and contact 26, operating and connected as heretofore described, along wire 168 to terminal 170 across switch 172 to terminal 174 and thence along wire 176 to one terminal of lamp 5. Returning from the lamp, the current passes along wire 178, to switch member 164, of switch 160, which is grounded in the same manner as switches 68 134 and 140. Correspondingly, some of the current which, as heretofore explained, is at switch 14 and contact 18 when the engine is stopped, is taken along wire 130 thru junction 128, wire 180 to terminal 182, across switch 172 to terminal 184, and thence along wire 186 to switch member 162, of switch 160 and thence to ground as before mentioned. The result is that when the engine stops and the gears are in mesh and switch 160 (or 161) is therefore closed, lamp 5 lights and buzzer 44 sounds until such time as the operator moves the gear shafts to disengage the gears, thereby opening switch 160 (or 161), and in so far as this circuit is concerned cutting off buzzer 44 and extinguishing lamp 5.

Switch 172 is provided with a terminal 196 connected to a wire running to junction 204, thence along wire 208, thru junction 50, wire 48, to contact 28; also with a terminal 198 connected by wire 108, and wire 110, to lamp 7, so that when switch 172 is turned across these terminals lamp 7 may light.

On the opposite side of switch 172 is terminal 200, connected to a wire running to junction 212, thence to junction 84, along wire 82, to contact 20, and terminal 202, connected to a wire running to junction 206 thru junctions 124, 219, and 116, along wire 118, to ground 76, so that when the switch is turned across these terminals buzzer 44 may sound. Switch 22 and switch 14 so control these circuits that with the switch 172 across terminals 196 and 198, and 200 and 202, lamp 7 and buzzer 44 will only operate when the engine is running. This switch is only made use of by the operator while the engine is running, to cut out the lamp and buzzer signals controlled by switch 160 or its companion part 161 should the connections and mechanism related to switch 14 and switch 22 become inoperative, but after being properly adjusted and the engine is started, the buzzer and lamp will indicate a switch off, whereupon the operator will turn the switch back to position as shown in the drawing.

Attached to the controlling bar 188 of switch 160 is switch 190 operating in connection with the ground circuit switch members 192 and 194. This is a double switch, and its related members are of the same construction, arrangement and operation as that of switches 160 and 161, except that switches 190 and 191 are insulated. One of them is put in operation every time the gear shafts are shifted to one of four positions commonly known as high, second, low, and reverse so that when the engine is running and the brake is on or set, the circuits heretofore described, controlling lamp 4 and buzzer 44 thru switch 152 are grounded, thereby causing lamp 4 to light and buzzer 44 to sound.

Switches 160 and 190 are shown in more detail in Figures 9 and 10 of the drawings.

Lamp 6 is in a circuit controlled by a conventional ignition switch, diagrammatically shown. The detailed circuit by which current passes from battery 12 to lamp 6 is as follows:—Current leaving the battery 12 travels along wire 214 to switch 216; on closing switch 216 to terminal 218 thence along wire 220 to contact 32; circuit closing bar 30, contact 34, thence along wire 222, thru junction 224, to terminal 226, of switch 228, across the switch to terminal 230, thence along wire 232 to one terminal of lamp 6. Returning from the lamp the current passes along wire 234 to junction 124 thru junctions 219 and 116, along wire 118 to ground terminal 76.

One part of the current for the buzzer leaves junction 224 and passes along the wire to one terminal of buzzer 236, thru the buzzer to the opposite terminal, thence along a wire connected to terminal 238, of switch 228, across that switch to terminal 240, thence along a wire to junction 124, thru junctions 219 and 116, along wire 118, to ground terminal 76.

The result of this arrangement is that when the engine stops and the ignition switch is left on, lamp 6 will light and buzzer 236 will sound until such time as the operator turns off the switch.

Switch 228 is provided with a terminal 242 connected to a wire running thru junction 204 along wire 208 to junction 50 thence along wire 48 to contact 28, and a terminal 244 connected by wire 108 and wire 110 to lamp 7, so that when switch 228 is turned across these terminals lamp 7 may light.

On the opposite side of switch 228 is terminal 246 connected to a wire running thru junction 212 to junction 84, along wire 82 to contact 20, and terminal 248 is connected by a wire running to junction 219 thru junction 116, along wire 118 to ground terminal 76, so that when the switch is turned across these terminals buzzer 236 may sound. Switch 22 and switch 14 so control these circuits that with the switch 228 across terminals 242 and 244, and 246 and 248, lamp 7 and buzzer 236 will only operate when the engine is running. The use of this switch is for the same purpose as heretofore detailed in connection with switch 172.

From the foregoing it will be seen that the circuit arrangements described provide one buzzer signal for the ignition switch and one buzzer signal in common with all the other devices, and a lamp signal for each of the devices, operatable while the engine is running, which it is desired to give warning of at the time, and that it also provides similar signals for the ignition switch and for those devices which it is desirable, warning shall be given when the engine stops and that it also provides a signal which will remind the operator in case he has temporarily cut off or destroyed or neglected the signals which show during the operating period.

The specific form of mechanism by which the level of gasoline operates switch 68 heretofore referred to, is shown in Figures 2 and 3. In this mechanism there is a small tank 260 suitably supported by any suitable means, in the particular case here illustrated, by the rods 262 and 264 attached by angle irons 266 to a convenient point on the automobile thru the agency of bolts or screws entering the perforations 268 provided for the purpose. This tank 260 has a bottom perforation 270 thru which it is supplied with gasoline from the main tank of the automobile. The tank is covered by a suitable cover plate 272 entered by the rods 262—264. Rod 264 at least has a lower discharge port 274 entering the tank 260 so as to provide an air vent for said tank thru pipe 264, the upper end of the pipe being protected by reversely turned hollow tube 274 open to the air at 276.

In the center of cover 272 is a vertically extending perforation 278 terminating in a hollow tube 280 rigidly secured in place by any suitable means. Sliding thru this perforation and tube is a vertically reciprocatable rod 282 carrying on its lower end a float 284 adapted to be raised and lowered by the gasoline, as described, fluctuating in tank 260. Above the float and on the rod 282 is a conical valve member 286 adapted to seat itself in the lower end of perforation 278 when the float rises.

The upper end of rod 282 terminates in a cap 288 of insulating material which slips over and reciprocates upon the upper end of pipe 280. The upper portion of this cap 288 terminates in a comparatively small vertical rod 288$^a$ which slidably extends thru a horizontal plate 290 of insulating material held rigidly in place adjacent to angles 266 by the two sets of nuts 292 and 294. On the upper end of member 288$^a$ is a screw 296 comparatively loosely holding switch 68, heretofore referred to, so that it can adjust itself to contact three screws 298—300—302 arranged around the central axis of the vertical rod 288$^a$. These screws just mentioned are connected to metal bridge plates 304—306—308 embedded in the material of horizontal plate 290 and engaged in said metal bridge plates by the lower ends of these screws. To the outer ends of these bridge plates wires 64—74—92 are connected to screw terminals 66—72—94.

The result of the construction just described, is that when the float 284 elevates rod 282 and rod 288$^a$, switch 68 is raised off from the screw caps 298—300—302, thus breaking the circuits at those points in the diagram of Figure 1, as described, and when gasoline settles in the tank 260 so that float 284 can move downward sufficiently, switch 68 adjusts itself in contact with said three screws, thus closing the circuits named in the manner described, and for the purposes set forth in the diagram of Figure 1.

In order to protect the adjacent parts a flexible member 310 is provided below the plate 290 and about the top of cap 288. This flexible member 310 moves up and down as the rod 288ª moves and in all positions protects the parts above it, this particularly so that the fumes of gasoline cannot readily pass thru the perforation in which member 288ª reciprocates up thru switch 68 and engaging contacts.

The contact mechanism described is covered by a suitable cap 312 attached by any suitable means, as for instance, the screw threads 314, shown.

The lower portion of cap 288 and attached parts is enclosed by suitable case member 314ª, perforated on the bottom for the free circulation of air and for the reception of rods 262—264 and the rod 280. This case member is held in place at its top by angle members 316, constructed and attached as shown, secured in place between plate 290 and the angle members 266. This case 310 is a dust and mud guard for the protection of the enclosed parts.

Figures 4 and 5 show a water tank device 320 carrying a float 322 reciprocable by water entering the tank from the radiator thru a pipe mechanism 324. The float reciprocates the rod 326 on whose upper end is the switch 134 contained within a housing and contacting screw points 330. As the mechanism is substantially shown and described in prior patent application Serial No. 416,874, filed October 14, 1920, further details of construction are unnecessary at this point.

Figure 6 shows a switch mechanism operatable to show the condition of the fan belt of the fan attached to the block of the automobile engine. This is described in detail in connection with Figure 1. The particular switch mechanism shown consists of a base 332 to which are attached vertical curved switch contact members 142—144 and 148—150 as shown, located on opposite sides of the central shaft 334 adapted to be rotated by a lever 146 outside of the case 336 which covers the base. On the upper end of lever 146 is a wheel 147 which bears on the fan belt 147ª. Inside the case 336 and in proper position to selectively contact and connect the member 142 and 144, is a switch connecting member 140 normally retained in the position shown by a spring 338 connected at one end to member 140 and at the other end to a stationary point as 340.

The switch connecting member 140 is also adapted when the lever 146 is swung to 90° to cross connect contact members 148—150, fully described in connection with Figure 1. In the operation of the device the fan belt in its normal operation sustains the pulley in such a position that the connecting member 140 is clear of the switch bars 142 and 144. When, however, the belt loosens or breaks spring 338 pulls the connected parts downward until member 140 contacts members 142 and 144, for the purposes described.

The hand brake mechanism of Figures 7 and 8 comprises a case 342 having an insulation back member 344 and an insulation base 346. Suitably suspended on the back wall 344 are a pair of semi-circular switch contact members 348 and 350, each of U-shaped construction, as shown in Figure 8, to whose lower ends are connected wires leading to the terminals 351 and 352 connectable to the main circuit as shown in Figure 1. In the lower portion of the device is a horizontal shaft 354 operated by lever 156 connected to and in turn movable by rod 156ª attached to the hand brake lever 156ᵇ of the automobile. Extending upward from the shaft 354 is a switch connecting bar 152, adapted to be selectively moved by lever 156 into and out of contact with members 348 and 350, connectable to the main circuit as shown in Figure 1.

In the gear shift mechanism shown in Figures 9 and 10, there is a vertical insulating plate 370 rising from an insulating base 372 in such a manner that the wall 370 occupies about the middle portion of a metallic case 374.

Entering one side of this case and journaled on an adjacent side of middle wall 370 is a shaft 376 adapted to be rocked by the lever 166, in the manner heretofore described. In alinement with shaft 376 on the other side of the partitioned wall 370 is another shaft 378 rocked by the lever 167 in the manner described. Each of these levers thru these shafts operate independent switch mechanisms in the manner and for the purposes set forth.

As far as mechanical construction is concerned, it will be sufficient to describe one of them, in the particular case in question, the left hand one in Figure 9. In this construction there are semi-circular pairs of arcuate contact members 162 and 164 and 192 and 194 placed respectively top and bottom around the shaft 376, as clearly shown in Figure 9. Each half of each one of these members 162—194 is made in plan view as shown at 348, Figure 8, so that when switch connecting member 160 is at its upper position, as shown in Figure 10, and when member 190 is in its lower position, as shown in that figure, they do not contact the adjacent members as 162, but that when shaft 376 is rotated to one side or the other of the vertical center line shown, the member 160, for instance, passes into close contact with opposite side portions of members 162—164, thus connecting them in the manner described in connection with Figure 1.

The arcuate switch members are connected to suitable terminals shown at the bottom of the box by metal parts or similar connecting wires as shown in Figure 9.

The signal box, shown in Figures 11, 12, and 13 as the face or top, end, and side views respectively, is made in three sections. The top and bottom sections are held together by two bolts and nuts placed at opposite ends. The side section is held in proper position, relative to the other sections, by two spring members, shown in the figures, having holes in their outer ends which fit securely over knobs riveted in the ends of the top section.

The side section is made to accommodate the lamps. A piece of frosted glass, titled and numbered to correspond with the various parts to which indicating devices are attached, and previously described, is fitted properly along the openings, as shown in Figure 13, and is held in place by partitions, formed of one piece of metal, with ends fastened to the inside ends of this section by the rivets holding the spring members in place, and which may be viewed on the right and left ends of Figure 11. An opening is provided in the back side of the box, as shown in Figure 13, by which the cable of wires and connection to the engine manifold enter the box.

Members 1, 2, 3, 5, and 6 of Figure 11 are switch knobs for operating the switches 58, 132, 136, 172 and 228 respectively, and heretofore described.

The two bolts and nuts in about the center of the bottom of the box as shown in Figure 11, one of which being shown in Figure 12, are for the purpose of fastening the box to the steering post of an automobile, or these may be replaced by screws in case it should be desired to fasten the box to the instrument dash or other locations.

The switchboard and assembled parts are shown in Figures 14, 15 and 16 as the face or top, side, and bottom views respectively. The switchboard is to be moulded of insulating material and made of a size to fit the signal box and held in place therein by the end bolts, heretofore described, entering through the holes shown in the right and left ends of the board and by sleeves over those bolts, such as the one shown in Figure 12.

In the top part of Figure 14 are located the metal lamp sockets and their circuit terminal members to which the circuit wires may be attached, and are numbered to correspond with the numbers of the lamps as shown in Figure 1.

The circuit terminal contact parts of the five switches, heretofore described, and numbered 58, 132, 136, 172, and 228, are here shown assembled, and are numbered, in part, to indicate their circuit connections. The independent screw terminals, as represented by screw heads, in the central portion of Figure 14 are for the purpose of connecting circuit wires.

Figure 15 shows a side view, in part, of the general assembly of the operating members of the switchboard. Members 1, 2 and 3 are switch knobs, and a part of one switch mechanism is shown in connection with knob 2. On the lower left hand side is located one buzzer, and on a line with the buzzer to its right is shown a part of the main switch mechanism, and continuing, is one of the lamps in position, and a section of the titled and numbered glass to be placed in front of the lamps.

In Figure 16 there may be viewed buzzers 44 and 236, and main switch mechanism, placed and assembled in preferred positions, also independent screw terminals, represented by screw heads, to which the wires leading into the signal box are to be connected.

This application is a continuation of a great deal of the matter contained in my original applications, Serial Numbers 333,642 and 369,283, heretofore abandoned after the filing of this application.

I claim—

1. In an automobile, an electric circuit including a source of electric energy, a signal and a switch for operating it, a second electric circuit including the same source of electric energy, a different signal 5 and a switch for operating it, a third switch mechanism 36 movable between two positions in which the two circuits are alternatively operative by said source of electric energy and means operated thru the action of a moving part of the automobile engine for maintaining said third switch in one of said positions.

2. In an automobile, an electric circuit including a signal 44 and a switch for operating it, a second electric circuit including the same signal and a switch for operating it, a third switch mechanism 36 movable between two positions in which the two circuits are alternatively operative, and means operated thru the action of a moving part of the automobile engine for maintaining said third switch in one of said positions while the engine moves.

3. In an automobile, an electric circuit including a source of electric energy, a signal and a switch for operating it, a second electric circuit including the same source of electric energy, a different signal 5 and a switch for operating it, a third switch mechanism 36 movable between two positions in which the two circuits are alternatively operative by said source of electric energy, and means operated thru the action of a moving part of the automobile engine for maintaining said third switch in one of said positions, and means automatically holding said switch in the opposite position when the automobile engine is at rest.

4. In an automobile, an electric circuit including a signal 44 and a switch for operating it, a second electric circuit including the same signal, and a switch for operating it, a third switch mechanism 36 movable between two positions in which the two circuits are alternatively operative, means operated thru the action of a moving part of the automobile engine for maintaining said third switch in one of said positions while the automobile moves, and means automatically holding said switch in the opposite position when the automobile engine is at rest.

5. In mechanism of the class described, an electric circuit including a signal 1 and a switch for operating it, a supplemental electric circuit including a signal 7, a second switch 36 movable between two positions in one of which it closes the first circuit so that the first signal 1 may be operatable in the main circuit, and in the other of which it closes the second circuit so that the second signal 7 may be operatable in the supplemental circuit, and a third switch 58 movable between two positions in one of which the first signal 1 if operatable thru the proper positioning of the first two switches in the main circuit will be energized, otherwise not, and in the other of which the second signal 7 if operatable thru the alternative proper positioning of the second switch in the supplemental circuit will be energized, otherwise not.

6. In mechanism of the class described, an electric circuit including a signal 1 and a switch for operating it, a supplemental electric circuit including a signal 7, a second switch controlling mechanism 36 movable between two positions in one of which it closes the first circuit so that the first signal 1 is operatable in the main circuit, and in the other of which it closes the second circuit so that the second signal 7 may be operated in the supplemental circuit, a third switch 58 movable between two positions in one of which the first signal 1 if operatable thru the proper positioning of the first two switches in the main circuit will be energized, otherwise not, and in the other of which the second signal 7 if operatable thru the alternative positioning of the second switch in the supplemental circuit will be energized, otherwise not, and means operated thru the action of a moving part of the automobile engine adapted when the device is applied in an automobile to maintain the second switch in such position that the first signal 1 may be operated while the engine is running, while the second signal is only operative when the engine stops.

7. In mechanism of the class described, an electric circuit including a signal 1 and a switch for operating it, a supplemental electric circuit including a signal 7, a second switch controlling mechanism 36 movable between two positions in one of which it closes the first circuit so that the first signal 1 is operatable in the main circuit and in the other of which it closes the second circuit so that the second signal 7 may be operated in the supplemental circuit, a third switch 58 movable between two positions in one of which the first signal 1 if operatable thru the proper positioning of the first two switches in the main circuit will be energized, otherwise not, and in the other of which the second signal 7 if operatable thru the alternative positioning of the second switch in the supplemental circuit will be energized, otherwise not, and means operated thru the action of moving parts of the automobile engine adapted when the device is applied to an automobile to maintain the second switch in such position that the first signal may be operated while the engine is running, while the second signal is only operative when the engine stops, and means automatically holding said switch in the opposite position when the automobile is at rest.

8. In mechanism of the class described, in combination with a plurality of parts of an automobile which may get out of order while the automobile is running, and another group of parts which may require attention when the automobile stops, a set of signals of one class, one for each of such parts in the automobile, one common signal of another class, an electric circuit for each signal of the first class, electric circuits for the signal of the second class, a switch for each circuit operated by the adjacent part whose condition is to be indicated, and means for supplying electric current to all of such circuits, this in combination with switch mechanism controlled thru the action of a moving part of the automobile engine movable to two positions, in one of which the signals for the parts whose condition is to be noted while the engine is moving are energized only when the engine is moving and the other of which the parts whose condition is to be noted when the engine is stopped are energized only when the engine is stopped.

9. In mechanism of the class described, in combination with an automobile engine and a part thereof whose condition is to be indicated while the engine is moving, a signal device for said part, a switch operated by said part for operating said signal, an electric circuit including said signal and switch, a second electric circuit including another signal, means operated by a moving part of the engine rendering the circuit to the first signal effective only while the engine is running and a transfer switch in the first circuit adapted to cut off the first signal and throw in the second signal.

10. In mechanism of the class described, in combination with an automobile engine and a part thereof whose condition is to be indicated while the engine is stopped, a signal for said part, an electric circuit including said signal, a second electric circuit including another signal, means automatically operated by a moving part in combination with a switch mechanism rendering the circuit to the first signal effective when the engine is stopped and a transfer switch for said circuits adapted to cut off the first signal and throw in the second signal effective when the engine is running.

In witness whereof, I have hereunto subscribed my name in the presence of two witnesses.

WILLIAM S. LA LONDE.

Witnesses:
DWIGHT B. CHEEVER,
VELMA GRIFFITH.